(12) United States Patent
Tanaka et al.

(10) Patent No.: US 12,552,533 B2
(45) Date of Patent: Feb. 17, 2026

(54) INFORMATION PROCESSING SYSTEM, NOTIFICATION METHOD, AND UNMANNED AERIAL VEHICLE

(71) Applicant: Rakuten Group, Inc., Tokyo (JP)

(72) Inventors: Daiki Tanaka, Tokyo (JP); Toshiaki Tazume, Tokyo (JP); Takayoshi Inuma, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 498 days.

(21) Appl. No.: 17/956,355

(22) Filed: Sep. 29, 2022

(65) Prior Publication Data

US 2023/0119052 A1     Apr. 20, 2023

(30) Foreign Application Priority Data

Oct. 18, 2021    (JP) ................................ 2021-170071

(51) Int. Cl.
| | | |
|---|---|---|
| *B64C 39/02* | (2023.01) | |
| *G08G 5/55* | (2025.01) | |
| *G08G 5/57* | (2025.01) | |
| *G08G 5/76* | (2025.01) | |
| *B64U 10/13* | (2023.01) | |
| *B64U 70/00* | (2023.01) | |
| *B64U 101/60* | (2023.01) | |
| *B64U 101/64* | (2023.01) | |

(Continued)

(52) U.S. Cl.
CPC ............. *B64C 39/024* (2013.01); *G08G 5/55* (2025.01); *G08G 5/57* (2025.01); *G08G 5/76* (2025.01); *B64U 10/13* (2023.01); *B64U 70/00* (2023.01); *B64U 2101/60* (2023.01); *B64U 2101/64* (2023.01); *B64U 2201/10* (2023.01); *G06V 10/56* (2022.01); *G06V 10/60* (2022.01)

(58) Field of Classification Search
CPC .. B64C 39/024; G08G 5/0069; G08G 5/0091; B64U 2201/10; B64U 10/13; B64U 2101/60; B64U 2101/61; B64U 70/00; G06V 10/56; G06V 10/60; G06V 10/26
See application file for complete search history.

(56) References Cited

U.S. PATENT DOCUMENTS 6,085,152 A * 7/2000 Doerfel ................ G06V 30/144
                                                                   702/3
9,959,771 B1 * 5/2018 Carlson ................ G08G 5/0013

(Continued)

FOREIGN PATENT DOCUMENTS

| JP | 2018-070334 A | 5/2018 | |
| WO | 2006/049643 A2 | 5/2006 | |
| WO | WO-2022008930 A1 * | 1/2022 | ........... B64C 39/024 |

*Primary Examiner* — Jason Holloway
*Assistant Examiner* — Benjamin J Brosh
(74) *Attorney, Agent, or Firm* — Sughrue Mion, PLLC

(57) ABSTRACT

The delivery system S acquires sensing information sensed in a transfer area by a sensor mounted on UAV 1 that delivers an article, and determines whether visibility in the transfer area is good on the basis of the sensing information. Then, in a case where it is determined that the visibility is not good, the delivery system S performs a first notification processing for stopping a recipient who is going to receive the article from heading for the area, while in a case where it is determined that the visibility is good, the delivery system S performs a second notification processing for directing the recipient to head for the area.

9 Claims, 11 Drawing Sheets

(51) Int. Cl.
    *G06V 10/56*     (2022.01)
    *G06V 10/60*     (2022.01)

(56)            References Cited

U.S. PATENT DOCUMENTS

| | | | |
|---|---|---|---|
| 10,176,722 B1* | 1/2019 | Boyd | G08G 5/0069 |
| 10,472,090 B2* | 11/2019 | Kessler | B64D 47/08 |
| 10,553,122 B1* | 2/2020 | Gilboa-Amir | G06Q 10/0832 |
| 2008/0165031 A1* | 7/2008 | Estrada | G01S 17/95 |
| | | | 340/963 |
| 2017/0147975 A1* | 5/2017 | Natarajan | G07C 9/00182 |
| 2017/0313439 A1* | 11/2017 | Holt | G06V 20/17 |
| 2017/0337740 A1* | 11/2017 | Kim | G02C 7/04 |
| 2019/0087635 A1* | 3/2019 | Klaus | H04N 13/239 |
| 2020/0365041 A1* | 11/2020 | Kasilya Sudarsan | |
| | | | G08G 5/0091 |
| 2021/0221500 A1* | 7/2021 | Nakazawa | B64D 9/00 |
| 2021/0407303 A1* | 12/2021 | Yogesha | G05D 1/81 |
| 2023/0108853 A1* | 4/2023 | Tazume | G08G 5/003 |
| | | | 701/3 |

* cited by examiner

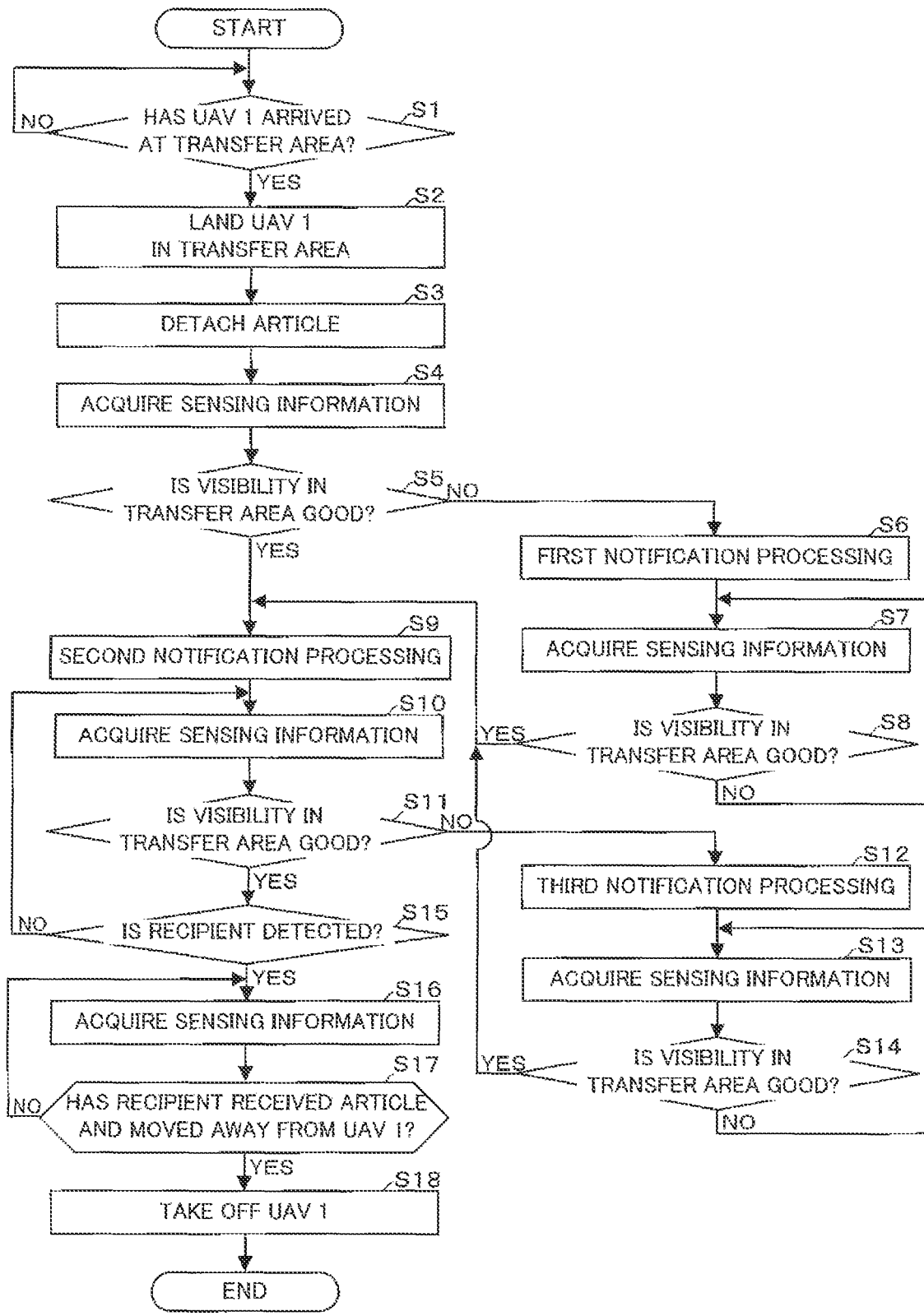

INFORMATION PROCESSING SYSTEM, NOTIFICATION METHOD, AND UNMANNED AERIAL VEHICLE

CROSS REFERENCE TO RELATED APPLICATION

This application claims priority from Japanese Patent Application No. 2021-170071 which was filed on Oct. 18, 2021, the disclosure of which is herein incorporated by reference in its entirety.

TECHNICAL FIELD

One or more embodiments of the present invention relate to a technical field such as a system that notifies a recipient that an unmanned aerial vehicle that delivers an article has arrived at a transfer place.

RELATED ART

Conventionally, a system is known that, when a moving body such as a vehicle or an unmanned aerial vehicle delivers an article to a delivery destination, notifies a recipient to come and receive the article when the moving body arrives at a transfer place of the article. For example, JP 2018-070334 A discloses a system in which a mobile terminal moving together with a moving body acquires position information of the moving body in time series, and sends out an arrival notification of the moving body to an operator at a delivery destination in response to matching of the position information with position information of the delivery destination of a package.

By the way, in a case where the moving body is an unmanned aerial vehicle, a transfer area of the article is limited, and thus, whereabouts of the recipient and the transfer area are often separated from each other. However, in a case where visibility in the transfer area is not good due to local formation of fog or cloud in the transfer area, the unmanned aerial vehicle may not be easily found even when the recipient receives the arrival notification of the unmanned aerial vehicle and heads for the area. This is particularly noticeable in a mountainous area (mountain area) with undulating altitude. Moreover, when the visibility in the transfer area is not good, it is not desirable for the recipient to head for the area.

Therefore, one or more embodiments of the present invention are directed to providing an information processing system, a notification method, and an unmanned aerial vehicle capable of appropriately notifying a recipient according to visibility conditions in a transfer area of an article.

SUMMARY

In response to the above issue, an information processing system includes: at least one memory configured to store program code; and at least one processor configured to access the program code and operate as instructed by the program code. The program code includes: acquisition code configured to cause the at least one processor to acquire sensing information sensed in a transfer area of an article by a sensor mounted on an unmanned aerial vehicle that delivers the article; determination code configured to cause the at least one processor to determine whether visibility in the area is good on a basis of the acquired sensing information; and notification code configured to cause the at least one processor to, in a case where it is determined that the visibility is not good, perform a first notification processing for stopping a recipient who is going to receive the article from heading for the area.

The program code may further include control code configured to cause the at least one processor to take off the unmanned aerial vehicle in a case where it is determined that the visibility is good after the article is detached from the unmanned aerial vehicle when the unmanned aerial vehicle is in a state of landing in the area.

The program code may further include detection code configured to cause the at least one processor to detect that the recipient has received the detached article and has moved away from the unmanned aerial vehicle. The control code may cause the at least one processor to take off the unmanned aerial vehicle in a case where it is determined that the visibility is good, and it is detected that the recipient has received the detached article and has moved away from the unmanned aerial vehicle.

The acquisition code may cause the at least one processor to acquire the sensing information sensed in the transfer area of the article by the sensor when the unmanned aerial vehicle is in a landing state, and the determination code may cause the at least one processor to determine whether the visibility in the area is good on the basis of the acquired sensing information when the unmanned aerial vehicle is in a landing state.

After the unmanned aerial vehicle has landed in the area, the notification code may cause the at least one processor to notify the recipient that the unmanned aerial vehicle has landed in the area in addition to performing the first notification processing.

In a case where it is determined that the visibility is good, the notification code may cause the at least one processor to perform a second notification processing for directing the recipient to head for the area.

Even after the second notification processing is performed, the determination code may cause the at least one processor to still determine whether the visibility is good in the area, and in a case where it is determined that the visibility is good after the second notification processing is performed, the notification code may cause the at least one processor to perform a third notification processing for canceling the recipient to head for the area.

The acquisition code may cause the at least one processor to acquire a visibility value based on light received in the transfer area of the article, and the determination code may cause the at least one processor to determine whether the visibility in the area is good on a basis of the acquired visibility value.

The determination code may cause the at least one processor to determine that the visibility in the area is good in a case where the visibility value is equal to or greater than a predetermined threshold value.

The determination code may cause the at least one processor to determine whether the visibility in the area is good on a basis of an image information included in the sensing information.

The determination code may cause the at least one processor to calculate a ratio of white pixels to a plurality of pixels constituting the image information, and determine that the visibility in the area is good in a case where the calculated ratio is smaller than a predetermined threshold value.

A notification method that is executed by one or a plurality of computers, includes: acquiring sensing information sensed in a transfer area of an article by a sensor mounted on an unmanned aerial vehicle that delivers the article; determining whether visibility in the area is good on a basis of the acquired sensing information; and performing a notification processing for stopping a recipient who is going to receive the article from heading for the area in a case where it is determined that the visibility is not good.

An unmanned aerial vehicle that delivers an article, includes: a sensor; at least one memory configured to store program code; and at least one processor configured to access the program code and operate as instructed by the program code. The program code includes: acquisition code configured to cause the at least one processor to acquire sensing information sensed in a transfer area of an article by a sensor mounted on an unmanned aerial vehicle that delivers the article; determination code configured to cause the at least one processor to determine whether visibility in the area is good on a basis of the acquired sensing information; and notification code configured to cause the at least one processor to, in a case where it is determined that the visibility is not good, perform a first notification processing for stopping a recipient who is going to receive the article from heading for the area.

BRIEF DESCRIPTION OF THE DRAWINGS

FIG. 8 is a flowchart illustrating an example of delivery and notification processing executed by the control unit 16 of the UAV 1.

DETAILED DESCRIPTION

Hereinafter, one or more embodiments of the present invention will be described with reference to the drawings. Incidentally, the following embodiments are embodiments in a case where the present invention is applied to a delivery system that delivers an article.

[1. Configuration of Delivery System S]

Figure 1:
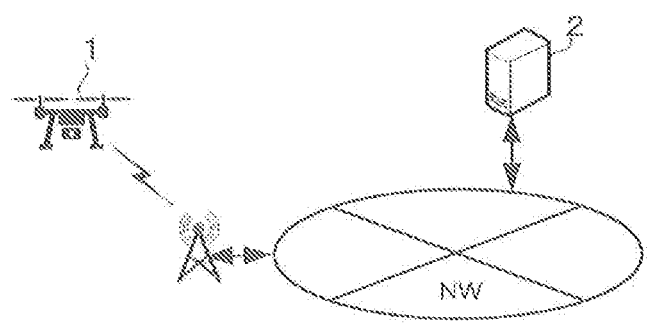
FIG. 1 is a diagram illustrating a schematic configuration example of a delivery system S.

To start with, a configuration of a delivery system S according to one embodiment of the present invention will be described with reference to FIG. 1. FIG. 1 is a diagram illustrating a schematic configuration example of the delivery system S. As illustrated in FIG. 1, the delivery system S includes a UAV (Unmanned Aerial Vehicle) 1 and a management server 2. The UAV 1, an example of an unmanned aerial vehicle, is also called a drone or a multi-copter, and can autonomously fly in air unmannedly. The management server 2 is a server for managing and controlling article delivery. The management server 2 can also control the UAV 1. Moreover, the management server 2 can communicate with the UAV 1 via a communication network NW. Incidentally, the communication network NW includes, for example, the Internet, a mobile communication network, a radio base station thereof, and the like.

Examples of articles as cargos (packages) loaded on the UAV 1 include supplement supplies, replenishment supplies, relief supplies, ordered items (for example, products or goods), and the like, but any articles may be used as long as they can be carried by the UAV 1. Such an article is delivered from a delivery base toward a transfer area of the article (hereinafter, simply referred to as a "transfer area"). The delivery base is, for example, a place where an article is loaded into the UAV 1. The transfer area is an area where the article is transferred from the UAV 1 to a recipient, and is located away from the whereabouts (for example, a hut, a warehouse, or the like) of the recipient. An expected arrival time at the transfer area of the UAV 1 may be notified in advance to the recipient who is going to receive the article together with position information of the area, and then, when the UAV 1 arrives at the transfer area, the arrival may be notified to the recipient.

However, as will be described later, in a case where the visibility is not good due to formation of fog or cloud in the transfer area, a notification for stopping the recipient who is going to receive the article from heading for the area is made. Here, the transfer area is, for example, an area including a ground on which the UAV 1 can take off and land and a real space above the ground. The article transfer may be performed when the UAV 1 is in a landing state in the transfer area, or may be performed in a state where the UAV 1 is hovering. Incidentally, a take-off and landing port through which the UAV 1 can take off and land may be provided on the ground in the transfer area.

Figure 2A:
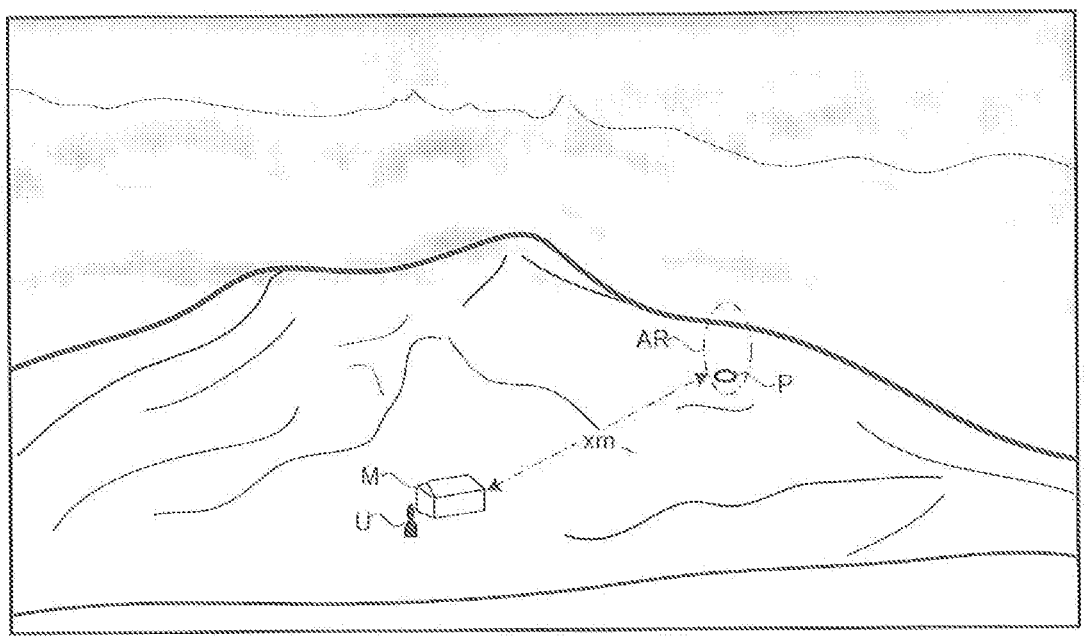
FIG. 2A is a conceptual diagram showing a state near a top of a mountainous area in a case where no fog is formed.
Figure 2B:
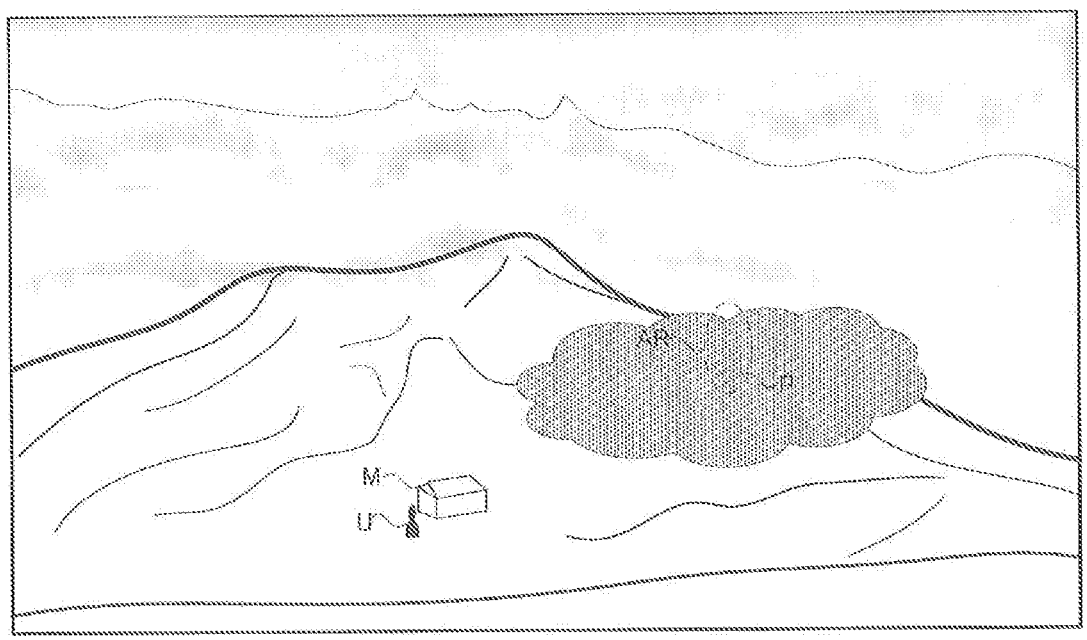
FIG. 2B is a conceptual diagram showing a state near a top of a mountainous area in a case where fog is formed.

FIG. 2A is a conceptual diagram showing a state near a top of a mountainous area in a case where no fog is formed, and FIG. 2B is a conceptual diagram showing a state near the top of the mountainous area in a case where fog is formed. As illustrated in FIG. 2A, there is a transfer area AR including a take-off and landing port P in a place x m (for example, several tens of meters to several hundreds of meters) away from a hut M near the top of the mountainous area. In the example of FIG. 2A, since no fog is formed in the transfer area AR, the visibility in the transfer area AR is good. On the other hand, in the example of FIG. 2B, since fog is formed in the transfer area AR, the visibility in the transfer area AR is not good. In the case of FIG. 2B, since it is not desirable for a recipient U to go to the transfer area AR, a notification for stopping the recipient U from heading for the transfer area AR is made to the recipient U.

[1-1. Configuration and Function of UAV 1]

Figure 3:
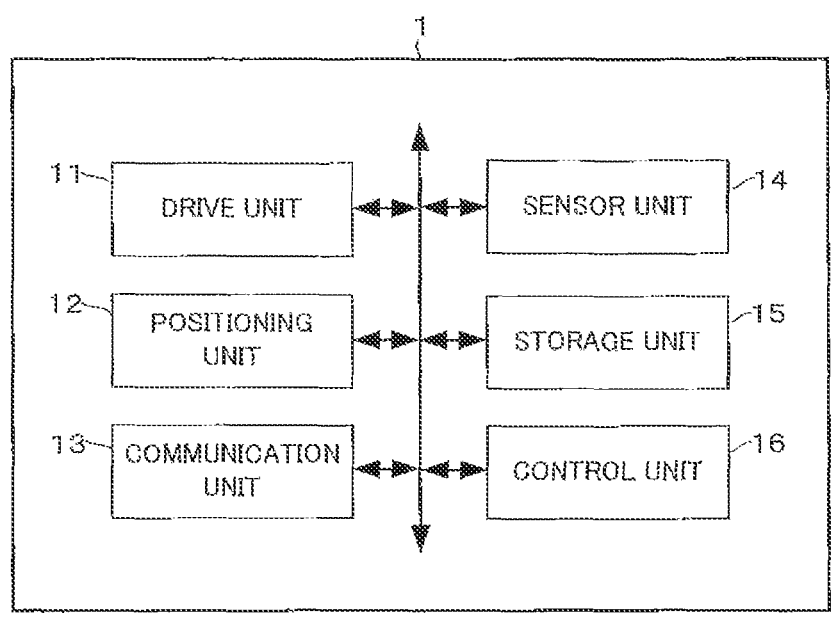
FIG. 3 is a diagram illustrating a schematic configuration example of an UAV 1.

Next, a configuration and functions of the UAV 1 will be described with reference to FIG. 3. FIG. 3 is a diagram illustrating a schematic configuration example of the UAV 1. As illustrated in FIG. 3, the UAV 1 includes a drive unit 11, a positioning unit 12, a communication unit 13, a sensor unit 14, a storage unit 15, a control unit 16, and the like. Furthermore, the UAV 1 includes a battery (not illustrated) that supplies power to each unit of the UAV 1, a rotor (propeller) that is a horizontal rotary wing, a housing body (e.g., housing box, storage box, or the like) for housing (storing) one or more articles to be loaded, and the like. The housing body may be provided with an opening/closing door on a side surface of the housing body, or may be provided with an opening/closing door on a lower surface of the housing body. Incidentally, the housing body may include a wire and a reel (a winch) for feeding or winding the wire. Accordingly, the housing body can be lowered in a ground direction while the UAV 1 is hovering.

The drive unit 11 includes a motor, a rotation shaft, and the like. The drive unit 11 rotates a plurality of rotors by the motor, the rotation shaft, and the like that are driven in accordance with a control signal output from the control unit 16. The positioning unit 12 includes a radio wave receiver, an altitude sensor, and the like. The positioning unit 12 receives, for example, a radio wave transmitted from a GNSS satellite with the radio wave receiver, and detects a current position (latitude and longitude) of the UAV 1 in a horizontal direction on the basis of the radio wave. Incidentally, the current position of the UAV 1 in the horizontal direction may be corrected on the basis of images captured by a camera of the sensor unit 14. The position information indicating the current position detected by the positioning unit 12 is output to the control unit 16. Furthermore, the positioning unit 12 may detect the current position (altitude) of the UAV 1 in a vertical direction by the altitude sensor such as an atmospheric pressure sensor. In this case, the position information includes altitude information indicating the altitude of the UAV 1. The communication unit 13 takes up communication control performed via the communication network NW.

The sensor unit 14 includes various sensors necessary for flight control of the UAV 1. Examples of the various sensors include an optical sensor, a visibility sensor, a triaxial angular velocity sensor, a triaxial acceleration sensor, and a geomagnetic sensor. Sensing information sensed by the sensor unit 14 (that is, sensing information obtained by the sensing) is output to the control unit 16. The optical sensor includes, for example, a camera, and continuously senses a real space within a range falling within an angle of view of the camera. The sensing includes reception of light (for example, visible light) that has passed through the real space. By sensing of the optical sensor, image information representing the real space within the range falling within the angle of view of the camera as pixel values (RGB values) is obtained. Such image information is included in the sensing information output to the control unit 16.

Figure 4A:
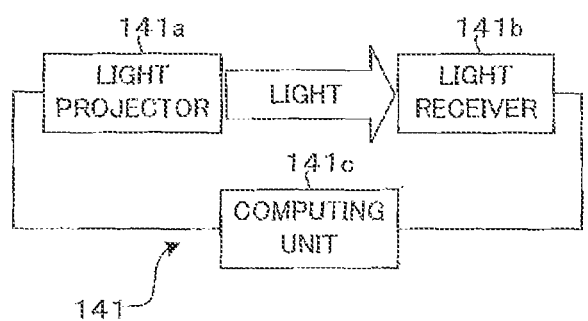
FIGS. 4A and 4B are schematic diagrams showing an example of a transmissive visibility sensor.
Figure 4B:
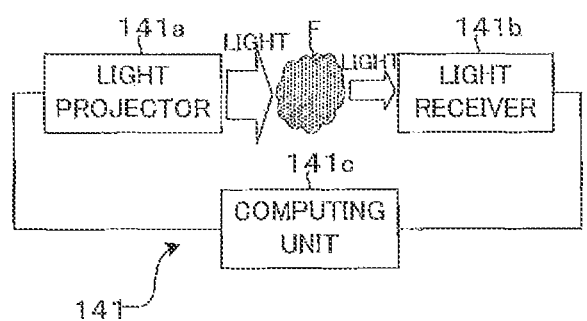

The visibility sensor is a sensor for measuring (an example of sensing) a visibility value (an example of sensing information) based on light (in particular, near infrared rays) received in the real space. Here, the visibility value is a value quantitatively representing the degree of visibility (unobstructed view), and may be represented by a visibility distance. In a case where the visibility value is greater than or equal to a threshold, it means that the visibility is good. Such visibility value is included in the sensing information output to the control unit 16. Examples of the visibility sensor include a transmissive visibility sensor using light transmittance and a reflective visibility sensor using light reflectance. FIGS. 4A and 4B are schematic diagrams showing an example of a transmissive visibility sensor, and FIGS. 5A and 5B are schematic diagrams showing an example of a reflective visibility sensor.

As shown in FIGS. 4A and 4B, a transmissive visibility sensor 141 includes a light projector 141a that emits light (in particular, near infrared rays), a light receiver 141b that receives the light that has been emitted from the light projector 141a and passed through the real space, and a computing unit 141c. The light projector 141a and the light receiver 141b are provided in such a way to face each other. The computing unit 141c obtains the light transmittance on the basis of amount of light emitted from the light projector 141a and amount of light received by the light receiver 141b, and measures the visibility value from the light transmittance. Such visibility value increases as the transmittance increases. In a state where there is no floating object such as a water droplet in the real space, as illustrated in FIG. 4A, the light emitted from the light projector 141a is received by the light receiver 141b without being substantially attenuated. On the other hand, in a state where there is a floating object such as a water droplet, as illustrated in FIG. 4B, the light emitted from the light projector 141a is scattered by a floating object F and is attenuated and received by the light receiver 141b. Therefore, in the computing unit 141c, the visibility value when fog or cloud is formed in the real space is measured to be lower than the visibility value when no fog or cloud is formed.

Figure 5A:
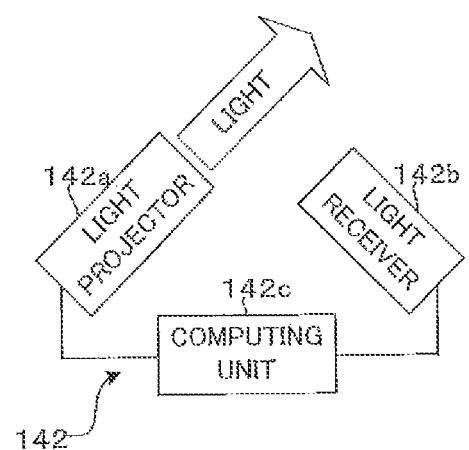
FIGS. 5A and 5B are schematic diagrams showing an example of a reflective visibility sensor.
Figure 5B:
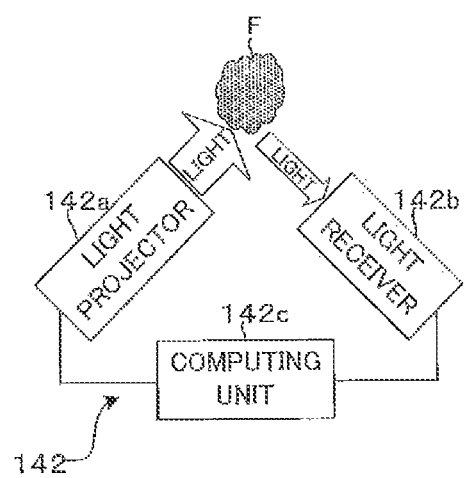

On the other hand, as shown in FIGS. 5A and 5B, a reflective visibility sensor 142 includes a light projector 142a that emits light (in particular, near infrared rays), a light receiver 142b that receives the light that has been emitted from the light projector 142a and passed through the real space, and a computing unit 142c. The light projector 142a and the light receiver 142b are provided in such a way not to face each other. The computing unit 142c obtains the light reflectance on the basis of the amount of light emitted from the light projector 142a and the amount of light received by the light receiver 142b, and measures the visibility value from the light reflectance. Such visibility value increases as the reflectance decreases. In a state where there is no floating object such as a water droplet in the real space, as illustrated in FIG. 5A, the light emitted from the light projector 142a is hardly received by the light receiver 142b. On the other hand, in a state where there is a floating object such as a water droplet, as illustrated in FIG. 5B, the light emitted from the light projector 142a is reflected by the floating object F and thus the reflected light is received by the light receiver 142b. Therefore, in the computing unit 142c, the visibility value when fog or cloud is formed in the real space is measured to be lower than the visibility value when no fog or cloud is formed.

The storage unit 15 includes a nonvolatile memory or the like, and stores various programs and data. Moreover, the storage unit 15 stores a vehicle ID for identifying the UAV 1. The vehicle ID is identification information for identifying the UAV 1. The control unit 16 includes at least one CPU (Central Processing Unit), a ROM (Read Only Memory), a RAM (Random Access Memory), and the like. The ROM or the storage unit 15 is configured to store a program (program code). The CPU (an example of processor) is configured to access the program code and operate as instructed by the program code. The program code includes: acquisition code configured to cause the CPU to acquire sensing information sensed in the transfer area by the sensor mounted on the UAV 1; determination code configured to cause the CPU to determine whether visibility in the area is good on the basis of the acquired sensing information; and notification code configured to cause the CPU to, in a case where it is determined that the visibility is not good, perform a first notification processing for stopping the recipient who is going to receive the article from heading for the area. The program code may further include control code configured to cause the CPU to take off the UAV 1 in a case where it is determined that the visibility is good after the article is detached from the UAV 1 when the UAV 1 is in a state of landing in the area. The program code may further include detection code configured to cause the CPU to detect that the recipient has received the detached article and has moved away from the UAV 1.

Figure 6:
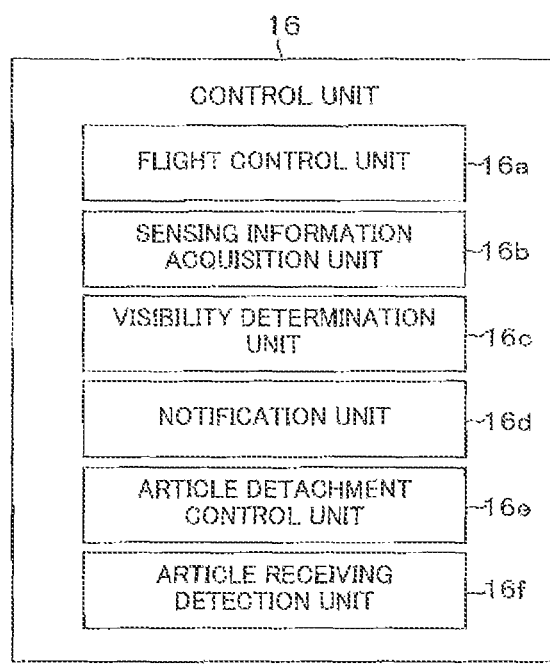
FIG. 6 is a diagram illustrating an example of functional blocks in a control unit 16.

FIG. 6 is a diagram illustrating an example of functional blocks in the control unit 16. As illustrated in FIG. 6, the control unit 16 functions as a flight control unit 16a, a sensing information acquisition unit 16b, a visibility determination unit 16c, a notification unit 16d, an article detachment control unit 16e, and an article receiving detection unit 16f in accordance with the program code stored in, for example, the ROM or the storage unit 15.

The flight control unit 16a performs a flight control to cause the UAV 1 to fly toward the transfer area. In such flight control, rotation speed of the rotor, as well as the current position, attitude, and traveling direction of the UAV 1 are controlled using the position information indicating the current position detected by the positioning unit 12, the sensing information sensed by the sensor unit 14, delivery destination information, and the like. Accordingly, the UAV 1 can autonomously fly toward the transfer area. The delivery destination information may be set in the UAV 1, for example, at the delivery base together with a delivery schedule and recipient information, or may be transmitted from the management server 2 together with the delivery schedule and the recipient information and set. The delivery destination information includes, for example, position information (latitude and longitude) of the transfer area. The recipient information includes, for example, an e-mail address or a telephone number of the recipient. Incidentally, during the flight of the UAV 1, the position information of the UAV 1 and the vehicle ID of the UAV 1 are sequentially transmitted to the management server 2 by the communication unit 13.

The sensing information acquisition unit 16b acquires the sensing information sensed in the transfer area by the sensor unit 14. Such sensing information may be continuously acquired in time series. Incidentally, the sensing information acquisition unit 16b may acquire the sensing information sensed from the air by the sensor unit 14 in the transfer area. In this case, orientation of the sensor unit 14 (for example, orientation of a lens of the optical sensor) is adjusted by the control unit 16 to be faced toward the ground (for example, the take-off and landing port). However, it is desirable to acquire the sensing information sensed by the sensor unit 14 when the UAV 1 is in a landing state. Accordingly, it is possible to determine the visibility conditions from the viewpoint of the recipient more than from the sky, and it is not necessary to adjust the orientation of the sensor unit 14.

The visibility determination unit 16c determines whether the visibility in the transfer area is good (that is, the visibility conditions) on the basis of the sensing information acquired by the sensing information acquisition unit 16b. Such determination may be continuously performed in time series. Incidentally, the visibility determination unit 16c may determine whether the visibility in the transfer area is good in a flying state (for example, a hovering state). However, it is desirable that the visibility determination unit 16c determine whether the visibility in the transfer area is good when the UAV 1 is in a landing state. Accordingly, it is possible to determine the visibility conditions from the viewpoint of the recipient. Examples of determination methods for the visibility conditions include a determination method using the visibility value and a determination method using the image information. In a case of the determination method using the visibility value, the visibility determination unit 16c determines whether the visibility in the transfer area is good on the basis of the visibility value included in the sensing information acquired by the sensing information acquisition unit 16b. As a result, the visibility conditions can be determined more accurately. For example, in a case where the visibility value is equal to or greater than a predetermined first threshold value, it is determined that the visibility in the transfer area is good. In other words, when the visibility value is equal to or greater than the first threshold value, it is estimated that no fog or cloud has been formed in the transfer area.

On the other hand, in a case of the determination method using the image information, the visibility determination unit 16c determines whether the visibility in the transfer area is good on the basis of the image information included in the sensing information acquired by the sensing information acquisition unit 16b. Accordingly, even when the visibility sensor is not mounted on the UAV 1, the visibility conditions can be determined by the camera normally mounted on the UAV 1. For example, a ratio of white pixels to a plurality of pixels constituting the image information (that is, a ratio of the number of pixels) is calculated, and in a case where the calculated ratio is smaller than a predetermined second threshold value, it is determined that the visibility in the transfer area is good. In other words, in a case where the ratio of the white pixels is smaller than the second threshold value, it is estimated that no fog or cloud is formed in the transfer area. Here, the white pixel may be, for example, a pixel whose R value, G value, and B value in the pixel values are each within the range of "245 to 255". Incidentally, the visibility value may be acquired on the basis of the ratio of the white pixels. For example, the smaller the ratio of the white pixels, the larger the visibility value is calculated. In this case, the visibility determination unit 16c determines whether the visibility in the transfer area is good on the basis of the calculated visibility value.

In a case where it is determined by the visibility determination unit 16c that the visibility is not good (poor visibility), the notification unit 16d performs a first notification processing for stopping a recipient who is going to receive the article from heading for the transfer area. By the first notification processing, it is to possible to keep the recipient who is scheduled to go to the transfer area from going to the transfer area to pick up the article. Thus, it is possible to appropriately notify the recipient according to poor visibility. In the first notification processing, the notification unit 16d may send a notification showing the article is not receivable, to the recipient. For example, an e-mail describing information such as "Do not head for the transfer area now (please do not come) because of heavy fog" or "It is impossible to receive articles due to heavy fog" is transmitted to the e-mail address of the recipient, or a message describing the information is transmitted to the telephone number of the recipient by SMS (Short Message Service) to notify the recipient (however, the recipient may be notified via other notification methods). Here, after the UAV 1 has landed in the transfer area, the notification unit 16d may notify the recipient that the UAV 1 has landed in the transfer area in addition to performing the first notification processing (e.g., together with the notification showing the article is not receivable). Accordingly, it is possible to let the recipient grasp the situations of the UAV 1, and it is possible to prevent the recipient from unnecessarily going out to search for (look for) the UAV 1.

On the other hand, in a case where it is determined by the visibility determination unit 16c that the visibility is good, the notification unit 16d performs a second notification processing for directing the recipient to head for the transfer area. By the second notification processing, it is to possible to cause the recipient to go to the transfer area to pick up the article. Thus, it is possible to appropriately notify the recipient according to good visibility. In the second notification processing, the notification unit 16d may send a notification showing the article is receivable, to the recipient. For example, an e-mail describing information such as "Please come to xxxx to pick up the article as the article has arrived" is transmitted to the e-mail address of the recipient, or a message describing the information is transmitted to the telephone number of the recipient by SMS, and in this way, the recipient is notified of the information. However, even after the second notification processing is performed (in other words, the recipient has received the notification showing the article is receivable), the visibility determination unit 16*c* may determine whether the visibility in the transfer area is good. Then, in a case where it is determined by the visibility determination unit 16*c* that the visibility is not good after the second notification processing is performed (the notification showing the article is receivable is sent), the notification unit 16*d* performs a third notification processing for canceling the recipient to head for the transfer area. By the third notification processing, it is to possible to stop the recipient to go to the transfer area to pick up the article. That is, even after the second notification processing is performed, the visibility determination unit 16*c* continuously monitors the visibility conditions, and in a case where the visibility is determined to be poor, the third notification processing is performed. Thus, it is possible to appropriately notify the recipient according to the change of the visibility conditions. In the third notification processing, the notification unit 16*d* may send a notification cancelling article receiving, to the recipient. Incidentally, the content (for example, the message) of the notification cancelling article receiving may be similar to the content of the notification showing the article is not receivable.

The article detachment control unit 16*e* performs detachment control for detaching (releasing) the article from the housing body of the UAV 1 when the UAV 1 is in a hovering state or in a landing state. In such detachment control, the wire is fed out in a state where the UAV 1 is hovering, and the housing body is lowered toward the ground, or the opening/closing door provided in the housing body is opened when the UAV 1 is in a landing state. Here, in a case where the detachment control of the article is performed when the UAV 1 is in a landing state, the flight control unit 16*a* performs landing control to land the UAV 1 in the transfer area (for example, to land at the take-off and landing port) before the detachment control. Then, after the article is detached from the UAV 1 (that is, after the detachment is detected) in a state where the UAV 1 has landed in the transfer area, when it is determined by the visibility determination unit 16*c* that the visibility is good, the flight control unit 16*a* performs take-off control to cause the UAV 1 to take off (i.e., the flight control unit 16*a* takes off the UAV 1). In other words, when it is determined by the visibility determination unit 16*c* that the visibility is not good after the article is detached, the flight control unit 16*a* does not cause the UAV 1 to take off (that is, take-off of the UAV 1 is prohibited). This takes into account that the recipient may come close to the UAV 1, which may enhance the safety of the recipient.

The article receiving detection unit 16*f* detects that the recipient has received the detached article and has moved away from the UAV 1. Such detection is performed, for example, by detecting a person by analyzing the image information included in the sensing information acquired by the sensing information acquisition unit 16*b* when the UAV 1 is in a landing state. Then, after the article is detached (separated) from the UAV 1 when the UAV 1 is in a state of landing in the transfer area, in a case where it is determined by the visibility determination unit 16*c* that the visibility is good and it is detected by the article receiving detection unit 16*f* that the recipient has received the detached article and has moved away from the UAV 1, the take-off control for causing the UAV 1 to take off is performed. In other words, even when the visibility determination unit 16*c* determines that the visibility is good, the flight control unit 16*a* does not cause the UAV 1 to take off until the article receiving detection unit 16*f* detects that the recipient has received the detached article and has moved away from the UAV 1. Accordingly, the safety of the recipient can be further enhanced.

[1-2. Configuration and Function of Management Server 2]

Figure 7:
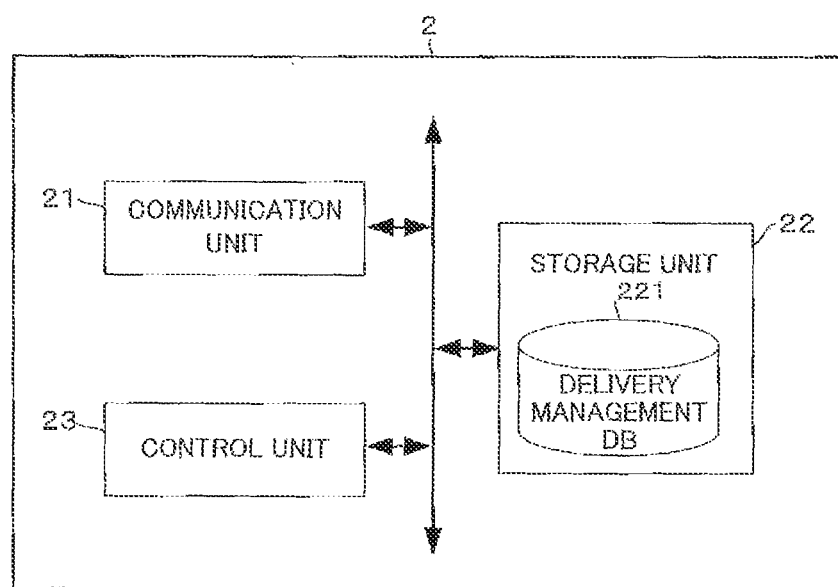
FIG. 7 is a diagram illustrating a schematic configuration example of a management server 2.

Next, a configuration and a function of the management server 2 will be described with reference to FIG. 7. FIG. 7 is a diagram illustrating a schematic configuration example of the management server 2. As illustrated in FIG. 7, the management server 2 includes a communication unit 21, a storage unit 22, a control unit 23, and the like. The communication unit 21 controls communication performed via the communication network NW. The position information and the vehicle ID transmitted from the UAV 1 are received by the communication unit 21. The management server 2 can recognize the current position of the UAV 1 based on the position information of the UAV 1. The storage unit 22 includes, for example, a hard disk drive or the like, and stores various programs and data. Moreover, in the storage unit 22, a delivery management database 221 and the like are constructed. The delivery management database 221 is a database for managing information related to article delivery. In the delivery management database 221, article information, vehicle information, the delivery destination information, the delivery schedule, the recipient information, and the like are stored (registered) in association with each other. Here, the article information includes information regarding an article to be delivered (for example, an article ID and the like). The vehicle information includes information regarding the UAV 1 that delivers the article (for example, the vehicle ID and the like).

The control unit 23 includes at least one CPU, a ROM, a RAM, and the like. The control unit 23 monitors the current position of the UAV 1 and controls the UAV 1 by appropriately transmitting a control command to the UAV 1. Such control may include at least one of the flight control of the UAV 1, the detachment control of the article, and the take-off and landing control of the UAV 1. Moreover, the control unit 23 may acquire the sensing information from the UAV 1 and determine whether the visibility in the transfer area is good instead of the UAV 1 on the basis of the sensing information. The determination method in this case is similar to the determination method using the visibility determination unit 16*c* of the UAV 1. Furthermore, in a case where it is determined that the visibility is not good, the control unit 23 may perform the first notification processing for stopping the recipient who is going to receive the article from heading for the transfer area. The notification method in this case is similar to the determination method using the notification unit 16*d* of the UAV 1. Incidentally, the UAV 1 may determine whether the visibility in the transfer area is good on the basis of the sensing information, and transmit the determination result to the management server 2. In this case, the control unit 23 performs above notification processing on the basis of the determination result from the UAV 1.

[2. Operation of Delivery System S]

Next, an operation of the delivery system S will be described with reference to FIG. 8. FIG. 8 is a flowchart illustrating an example of delivery and notification processing executed by the control unit 16 of the UAV 1. Incidentally, in the example of FIG. 8, it is assumed that the control unit 16 determines the visibility conditions and notifies the recipient when the UAV 1 is in a state of landing in the transfer area. The delivery and notification processing illustrated in FIG. 8 is started, for example, when the UAV 1 loading the article starts delivery from the delivery base according to the delivery schedule. Incidentally, before and after the delivery and notification processing, the expected arrival time of the UAV 1 at the transfer area may be notified to the recipient who is going to receive the article together with the position information of the area.

When the processing illustrated in FIG. 8 is started, the control unit 16 of the UAV 1 determines whether the UAV 1 has arrived at the transfer area (step S1). When it is determined that the UAV 1 has not arrived at the transfer area (step S1: NO), the processing returns to step S1. On the other hand, when it is determined that the UAV 1 has arrived at the transfer area (step S1: YES), the processing proceeds to step S2. In step S2, the control unit 16 performs the landing control to land the UAV 1 in the transfer area. Accordingly, when the landing of the UAV 1 is completed, the control unit 16 performs the detachment control for detaching the article from the housing body of the UAV 1 using the article detachment control unit 16e (step S3). As a result, the article is detached.

Next, the control unit 16 acquires the sensing information sensed in the transfer area using the sensing information acquisition unit 16b (step S4). Then, the control unit 16 determines whether the visibility in the transfer area is good using the visibility determination unit 16c on the basis of the sensing information acquired in step S4 (step S5). When it is determined that the visibility in the transfer area is not good due to the formation of fog or cloud (step S5: NO), the processing proceeds to step S6. On the other hand, when it is determined that the visibility in the transfer area is good (step S5: YES), the processing proceeds to step S9.

In step S6, the control unit 16 performs the first notification processing. For example, the notification unit 16d sends the notification showing the article is not receivable, to the recipient who is going to head for the transfer area. By the first notification processing, the recipient waits without starting heading for the transfer area. Next, the control unit 16 acquires the sensing information sensed in the transfer area using the sensing information acquisition unit 16b (step S7). Then, the control unit 16 determines whether the visibility in the transfer area is good using the visibility determination unit 16c on the basis of the sensing information acquired in step S7 (step S8). When it is determined that the visibility in the transfer area is not good because the fog or cloud continues (step S8: NO), the processing returns to step S7. On the other hand, when it is determined that the visibility in the transfer area is good due to clearing of the fog or cloud (step S8: YES), the processing proceeds to step S9.

In step S9, the control unit 16 performs the second notification processing. For example, the notification unit 16d sends the notification showing the article is receivable, to the recipient who is going to head for the transfer area. By the second notification processing, the recipient starts heading for the transfer area. Next, the control unit 16 acquires the sensing information sensed in the transfer area using the sensing information acquisition unit 16b (step S10). Then, the control unit 16 determines whether the visibility in the transfer area is good using the visibility determination unit 16c on the basis of the sensing information acquired in step S10 (step S11). When it is determined that the visibility in the transfer area is not good due to the formation of fog or cloud again (step S11: NO), the processing proceeds to step S12. On the other hand, when it is determined that the visibility in the transfer area is good (step S11: YES), the processing proceeds to step S15.

In step S12, the control unit 16 performs the third notification processing. For example, the notification unit 16d sends the notification cancelling article receiving, to the recipient who is going to head for the transfer area or heading for the transfer area. Next, the control unit 16 acquires the sensing information sensed in the transfer area using the sensing information acquisition unit 16b (step S13). Then, the control unit 16 determines whether the visibility in the transfer area is good using the visibility determination unit 16c on the basis of the sensing information acquired in step S13 (step S14). When it is determined that the visibility in the transfer area is not good because the fog or cloud continues (step S14: NO), the processing returns to step S13. On the other hand, when it is determined that the visibility in the transfer area is good due to clearing of the fog or cloud (step S14: YES), the processing returns to step S9, and the notification showing the article is receivable is sent again.

In step S15, the control unit 16 determines whether the recipient who has arrived at the transfer area has been detected on the basis of the sensing information acquired in step S10. When it is determined that the recipient who has arrived at the transfer area has not been detected (step S15: NO), the processing returns to step S10. On the other hand, when it is determined that the recipient who has arrived at the transfer area has been detected (step S15: YES), the processing proceeds to step S16.

In step S16, the control unit 16 acquires the sensing information sensed in the transfer area using the sensing information acquisition unit 16b. Next, the control unit 16 determines whether the article receiving detection unit 16f has detected that the recipient has received the detached article and has kept a predetermined distance or more from the UAV 1 on the basis of the sensing information acquired in step S16 (step S17). In a case where it is determined that the recipient has received the detached article and it is not detected that the recipient has kept the predetermined distance or more from the UAV 1 (step S17: NO), the processing returns to step S16. On the other hand, in a case where it is determined that it has been detected that the recipient has received the detached article and has kept the predetermined distance or more from the UAV 1 (step S17: YES), the control unit 16 performs the take-off control to cause the UAV 1 to take off (step S18). Accordingly, the UAV 1 takes off and returns to the delivery base.

As described above, according to the above embodiment, the delivery system S is configured to acquire the sensing information sensed in the transfer area by the sensor mounted on the UAV 1 that delivers the article, determine whether the visibility in the transfer area is good on the basis of the sensing information, and in a case where it is determined that the visibility is not good, perform the first notification processing for stopping the recipient who is going to receive the article from heading for the area, while in a case where it is determined that the visibility is good, perform the second notification processing for directing the recipient to head for the area. Accordingly, it is possible to appropriately notify the recipient in accordance with the visibility conditions in the transfer area.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. In the processing illustrated in FIG. 8, the UAV 1 is configured so that the article is detached from the housing body of the UAV 1 immediately after the UAV 1 lands. However, as another example, the UAV 1 may be configured so that the article is detached from the housing body of the UAV 1 after the UAV 1 lands and the recipient is detected. Moreover, in the processing illustrated in FIG. 8, in a case where it is detected that the recipient has received the article and has kept the predetermined distance or more from the UAV 1, it is determined again whether the visibility in the transfer area is good, and the UAV 1 may be caused to take off only in a case where it is determined that the visibility is good.

REFERENCE SIGNS LIST

1 UAV
2 Management server
11 Drive unit
12 Positioning unit
13 Communication unit
14 Sensor unit
15 Storage unit
16 Control unit
16a Flight control unit
16b Sensing information acquisition unit
16c Visibility determination unit
16d Notification unit
16e Article detachment control unit
16f Article receiving detection unit
21 Communication unit
22 Storage unit
23 Control unit
S Delivery System

What is claimed is:

1. An information processing system comprising: at least one memory configured to store program code; and at least one processor configured to access the program code and operate as instructed by the program code, the program code including:
    acquisition code configured to cause the at least one processor to acquire sensing information sensed in a landing state of a transfer area of an article by a sensor mounted on an unmanned aerial vehicle that delivers the article, such that visibility condition is determined from a viewpoint of a recipient,
    wherein the transfer area is an area where the article is transferred from the unmanned aerial vehicle to the recipient and is located beyond a predetermined distance from a current position of the recipient;
    determination code configured to cause the at least one processor to:
        determine a visibility value based on light received in the transfer area of the article, the sensing information including the visibility value;
        determine a pixel to represent fog or cloud formations that impair visibility when R value, G value, and B value of the pixel are each within an 8-bit color range of 245 to 255;
        calculate a ratio of pixels representing fog or cloud formations to a plurality of pixels constituting image information based on the sensing information; and
        determine that fog or cloud formations are formed in the transfer area and the visibility condition in the transfer area is not good when at least one of the visibility value being less than a predetermined first threshold value or the calculated ratio being equal to or greater than a predetermined second threshold value; and
    notification code configured to cause the at least one processor to, in a case where it is determined that fog or cloud formations are formed in the transfer area and the visibility is not good when at least one of visibility value being less than the predetermined first threshold value or the calculated ratio being equal to or greater than the predetermined second threshold value, perform a first notification describing information to stop the recipient from heading for the transfer area due to fog or cloud formations.

2. The information processing system according to claim 1, the program code further including control code configured to cause the at least one processor to take off the unmanned aerial vehicle in a case where it is determined that the visibility is good after the article is detached from the unmanned aerial vehicle when the unmanned aerial vehicle is in a state of landing in the transfer area.

3. The information processing system according to claim 2, the program code further including detection code configured to cause the at least one processor to detect that the recipient has received the detached article and has moved away from the unmanned aerial vehicle, wherein
    the control code causes the at least one processor to take off the unmanned aerial vehicle in a case where it is determined that the visibility is good, and it is detected that the recipient has received the detached article and has moved away from the unmanned aerial vehicle.

4. The information processing system according to claim 1, wherein
    the acquisition code causes the at least one processor to acquire the sensing information sensed in the transfer area of the article by the sensor when the unmanned aerial vehicle is in a landing state, and
    the determination code causes the at least one processor to determine whether the visibility in the transfer area is good on the basis of the acquired sensing information when the unmanned aerial vehicle is in a landing state.

5. The information processing system according to claim 1, wherein after the unmanned aerial vehicle has landed in the transfer area, the notification code causes the at least one processor to notify the recipient that the unmanned aerial vehicle has landed in the transfer area in addition to performing the first notification processing.

6. The information processing system according to claim 1, wherein in a case where it is determined that the visibility is good, the notification code causes the at least one processor to perform a second notification processing for directing the recipient to head for the transfer area.

7. The information processing system according to claim 6, wherein
    even after the second notification processing is performed, the determination code causes the at least one processor to still determine whether the visibility is good in the transfer area, and
    in a case where it is determined that the visibility is not good after the second notification processing is performed, the notification code causes the at least one processor to perform a third notification processing and alert the recipient.

8. A notification method, performed by at least one processor, the method comprising:
    acquiring sensing information sensed in a landing state of a transfer area of an article by a sensor mounted on an unmanned aerial vehicle that delivers the article, such that visibility condition is determined from a viewpoint of a recipient, wherein the transfer area is an area where the article is transferred from the unmanned aerial vehicle to the recipient and is located beyond a predetermined distance from a current position of the recipient;

determining a visibility value based on light received in the transfer area of the article, the sensing information including the visibility value, determining a pixel to represent fog or cloud formations that impair visibility when R value, G value, and B value of the pixel are each within an 8-bit color range of 245 to 255;

calculating a ratio of pixels representing fog or cloud formations to a plurality of pixels constituting image information based on the sensing information;

determining that fog or cloud formations are formed in the transfer area and the visibility condition in the transfer area is not good when at least one of the visibility value being less than a predetermined first threshold value or the calculated ratio being equal to or greater than a predetermined second threshold value; and in a case where it is determined that fog or cloud formations are formed in the transfer area and the visibility is not good, performing a first notification describing information to stop the recipient from heading for the transfer area due to fog or cloud formations.

9. An unmanned aerial vehicle that delivers an article, the unmanned aerial vehicle comprising:

a sensor;

at least one memory configured to store program code; and at least one processor configured to access the program code and operate as instructed by the program code, the program code including:

acquisition code configured to cause the at least one processor to acquire sensing information sensed in a landing state of a transfer area of an article by the sensor, such that visibility condition is determined from a viewpoint of a recipient, wherein the transfer area is an area where the article is transferred from the unmanned aerial vehicle to the recipient and is located beyond a predetermined distance from a current position of the recipient, determination code configured to cause the at least one processor to:

determine a visibility value based on light received in the transfer area of the article, the sensing information including the visibility value;

determine a pixel to represent fog or cloud formations that impair visibility when R value, G value, and B value of the pixel are each within an 8-bit color range of 245 to 255;

calculate a ratio of pixels representing fog or cloud formations to a plurality of pixels constituting image information based on the sensing information; and determine that fog or cloud formations are formed in the transfer area and the visibility condition in the transfer area is not good when at least one of the visibility value being less than a predetermined first threshold value or the calculated ratio being equal to or greater than a predetermined second threshold value; and notification code configured to cause the at least one processor to, in a case where it is determined that fog or cloud formations are formed in the transfer area and the visibility is not good when at least one of visibility value being less than the predetermined first threshold value or the calculated ratio being equal to or greater than the predetermined second threshold value, perform a first notification describing information to stop the recipient from heading for the transfer area due to fog or cloud formations.

* * * * *